United States Patent [19]
Bigus

[11] Patent Number: 6,112,194
[45] Date of Patent: Aug. 29, 2000

[54] METHOD, APPARATUS AND COMPUTER PROGRAM PRODUCT FOR DATA MINING HAVING USER FEEDBACK MECHANISM FOR MONITORING PERFORMANCE OF MINING TASKS

[75] Inventor: Joseph Phillip Bigus, Rochester, Minn.

[73] Assignee: International Business Machines Corporation, Armonk, N.Y.

[21] Appl. No.: 08/897,138

[22] Filed: Jul. 21, 1997

[51] Int. Cl.[7] .............................. G06F 17/00; G06F 17/20
[52] U.S. Cl. ............................................................ 706/11
[58] Field of Search ................................. 706/11, 15, 20, 706/21; 705/10; 707/3–7

[56] References Cited

U.S. PATENT DOCUMENTS

| | | | |
|---|---|---|---|
| 5,421,008 | 5/1995 | Banning et al. | 707/4 |
| 5,495,605 | 2/1996 | Cadot | 707/4 |
| 5,515,488 | 5/1996 | Hoppe et al. | 345/440 |
| 5,546,529 | 8/1996 | Bowers et al. | 345/348 |
| 5,572,650 | 11/1996 | Antis et al. | 345/356 |
| 5,592,663 | 1/1997 | Nagamori | 707/5 |
| 5,615,341 | 3/1997 | Agrawal et al. | 705/10 |
| 5,761,389 | 6/1998 | Maeda et al. | 706/59 |
| 5,860,069 | 1/1999 | Wright | 707/4 |
| 5,884,305 | 3/1999 | Kleinberg et al. | 707/6 |
| 5,930,803 | 7/1999 | Becker et al. | 707/14 |
| 6,026,397 | 2/2000 | Sheppard | 707/5 |

OTHER PUBLICATIONS

IEL User Guide, IEEE, pp. 1–104, 1996.
SIMPROCESS User's Guide, CACI Products Company, vol. 1, pp. 3–9, 51–55, 62–81, and 185–213, 1996.
D.A. Keim et al., "Supporting data mining of large databases by visual feedback queries," Tenth International Conference on Data Engineering, 1994, pp. 302–313, Feb. 1994.
Basden, A. "User Interface for Knowledge Discovery," IEE Colloquium on Knowledge Discovery and Data Mining (Digest No. 1996/198), pp. 7/1–7/4, Oct. 1996.
Khabaza, T. et al. "Data Mining with Clementine," IEE Colloquium on Knowledge Discovery in Databases, pp. 1/1–1/5, 1995.
"2.0 Hypothesis Verification and Information Discovery", IBM Corp. 1996, IBM BookManager Bookserver http://booksrv2.raleig . . . cmd/BOOKS/datamine/2.0.
"Data Mining Challenges for Digital Libraries", Robert L. Grossman, Nov. 8, 1996 http://www.lac.uic,edu. . . –dm–challenges–v4.html.
"Knowledge Discovery in Databases: An Overview", William J. Frawley, Gregory Piatetsky–Shapiro, and Christopher J. Matheus, Fall 1992, AI Magazine pp. 57–70.
"Intelligent Miner" IBM 1997 http://spi@spi.org/cgi. . . seeit&csum–15134621783.
"Clementine—A Data Mining Toolkit" http://www.mip.com.au/clemkit.html.
"Data Analysis and Data Mining" http://www/concept5.co . . . a_mining_overview.html.
"Evaluation Criteria for Data Mining Systems" Helge Grenager Solheim May 4, 1996 MET DST, http://www.pv-v.ntnu.no . . . ect/report/node27.html.
"Visualization of Associations", IBM Corp. http://www.almaden.ibm . . . emo/assoc/general.html.
*User's Guide Version 1 Release 1 for IBM Intelligent Miner for AIX, IBM Intelligent Miner for AS/400, IBM Intelligent Miner for OS/390,* IBM Corp. 1996 pp. 1–206.

*Primary Examiner*—Tariq R. Hafiz
*Assistant Examiner*—Jason W. Rhodes
*Attorney, Agent, or Firm*—Joan Pennington

[57] ABSTRACT

A method, apparatus and computer program product are provided for data mining including a feedback mechanism for monitoring performance of mining tasks. A user selected mining technique type is received for the data mining operation. A quality measure type is identified for the user selected mining technique type. The user selected mining technique type for the data mining operation is processed and a quality indicator is measured using the quality measure type. The measured quality indicator is displayed while processing the user selected mining technique type for the data mining operation.

13 Claims, 7 Drawing Sheets

| TECHNIQUE TYPE 302 | QUALITY MEASURE TYPE 300 |
|---|---|
| ASSOCIATION 304 | LIFT 314 |
| SEQUENTIAL PATTERNS 306 | LIFT 314 |
| CLASSIFICATION 308 | PERCENT ACCURACY 316 |
| CLUSTERING/SEGMENTATION 310 | CONDORCET MEASURE 318 |
| VALUE PREDICTION 312 | ROOT MEANS SQUARE ERROR 320 |
| * * * | |

METHOD, APPARATUS AND COMPUTER PROGRAM PRODUCT FOR DATA MINING HAVING USER FEEDBACK MECHANISM FOR MONITORING PERFORMANCE OF MINING TASKS

FIELD OF THE INVENTION

The present invention relates to the data processing field, and more particularly, relates to a method, apparatus and computer program product for data mining including a feedback mechanism for monitoring performance of mining tasks.

DESCRIPTION OF THE RELATED ART

A data mining tool is computer software that analyzes data and discovers relationships, patterns, knowledge, or information from the data. Data mining is also referred to as knowledge discovery. Data mining tools attempt to solve the problem of users being overwhelmed by the volume of data that computers can collect. Data mining tools attempt to shield users from the unwieldy body of data by analyzing it, summarizing it, or drawing conclusions from the data that the user can understand.

For example, one known computer software data mining product is the IBM Intelligent Miner for AIX, AS/400, and OS/390. The IBM Intelligent Miner is an enterprise data mining tool, designed for client/server configurations and optimized to mine very large data sets, such as gigabyte data sets. The IBM Intelligent Miner includes a plurality of data mining techniques or tools used to analyze large databases and provides visualization tools used to view and interpret the different mining results.

A problem with known data mining tools is that while the user on the client machine can be shown progress data of the particular data mining task that may take many hours, it is not possible to monitor the quality of the mining run. To make a determination to abort the job which has been running for 10 hours or to continue with the mining task, a need exists for feedback on the goodness or quality of the mining run. It is desirable to provide a feedback mechanism for the user to monitor performance of mining tasks.

SUMMARY OF THE INVENTION

A principal object of the present invention is to provide a method, apparatus and computer program product for data mining including a feedback mechanism for monitoring performance of mining tasks. Other important objects of the present invention are to provide such method, apparatus and computer program product for displaying a visual quality indicator, for example, displayed in a line graph on a computer display screen with mining task progress information; to provide such method, apparatus and computer program product substantially without negative effects and that overcome many disadvantages of prior art arrangements.

In brief, a method, apparatus and computer program product are provided for data mining including a feedback mechanism for monitoring performance of mining tasks. A user selected mining technique type is received for the data mining operation. A quality measure type is identified for the user selected mining technique type. The user selected mining technique type for the data mining operation is processed and a quality indicator is measured using the quality measure type. The measured quality indicator is displayed while processing the user selected mining technique type for the data mining operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
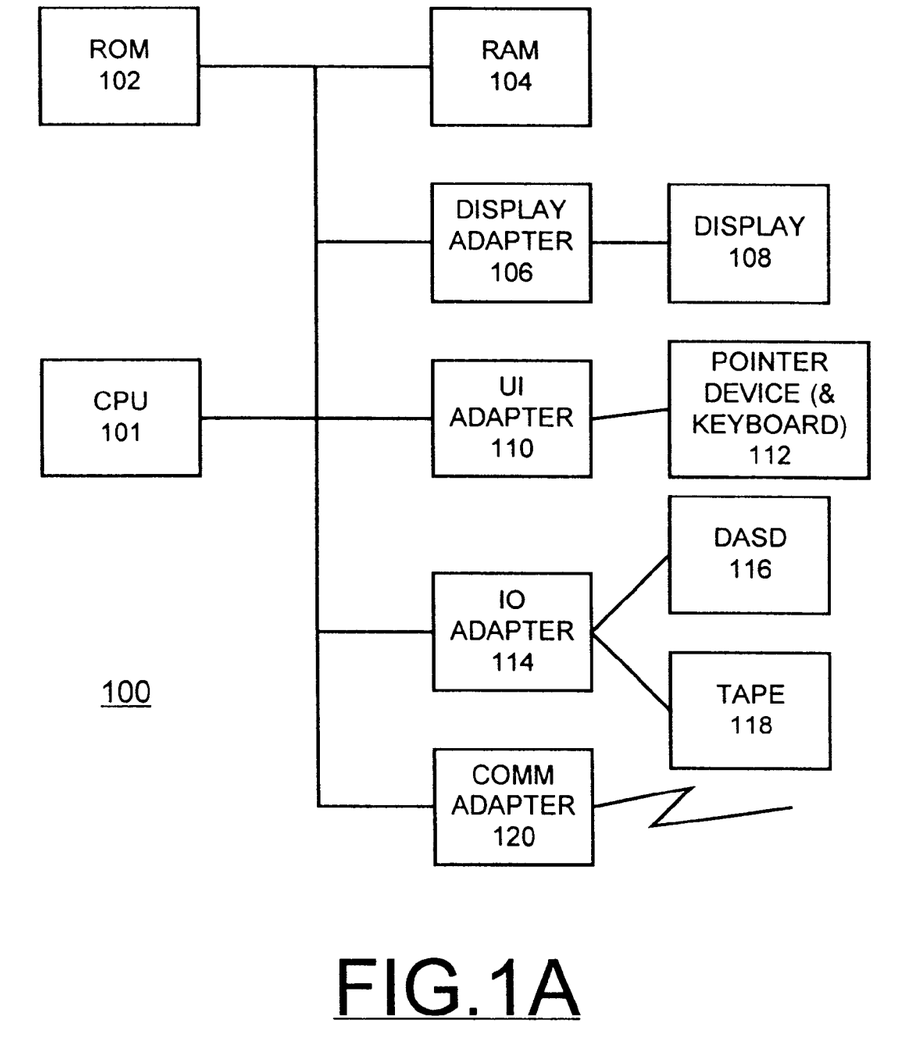
FIGS. 1A and 1B are block diagram representations illustrating a computer system and operating system for implementing a method for data mining including a feedback mechanism for monitoring performance of mining tasks in accordance with the preferred embodiment.
Figure 1B:
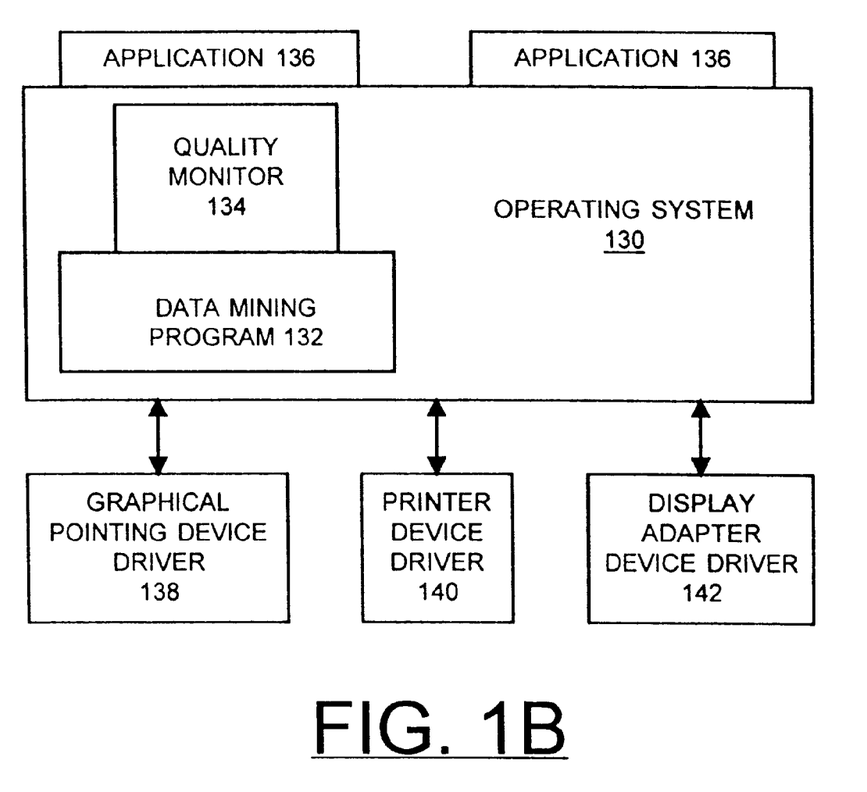

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes an operating system 130, a data mining program 132 and a quality monitor function 134 of the preferred embodiment. Multiple applications 136 and multiple device drivers including a graphical pointing device driver 138, a printer device driver 140, and a display adapter device driver 142 are supported by the operating system 130.

Various commercially available processors could be used for computer system 100, for example, an IBM personal computer or similar workstation can be used. Central processor unit 101 is suitably programmed to execute the flowchart of FIG. 4 and 5, and to generate the display screen of FIG. 2 of the preferred embodiment.

In accordance with features of the preferred embodiment, a mining technique specific quality measure type 300 is utilized to generate a quality indicator for a data mining operation. The data mining program 132 includes multiple different data mining technique types 302 with widely varying functions. The mining technique specific quality indicator 300 and data mining technique types 302 are illustrated and described with respect to FIG. 3.

Figure 2:
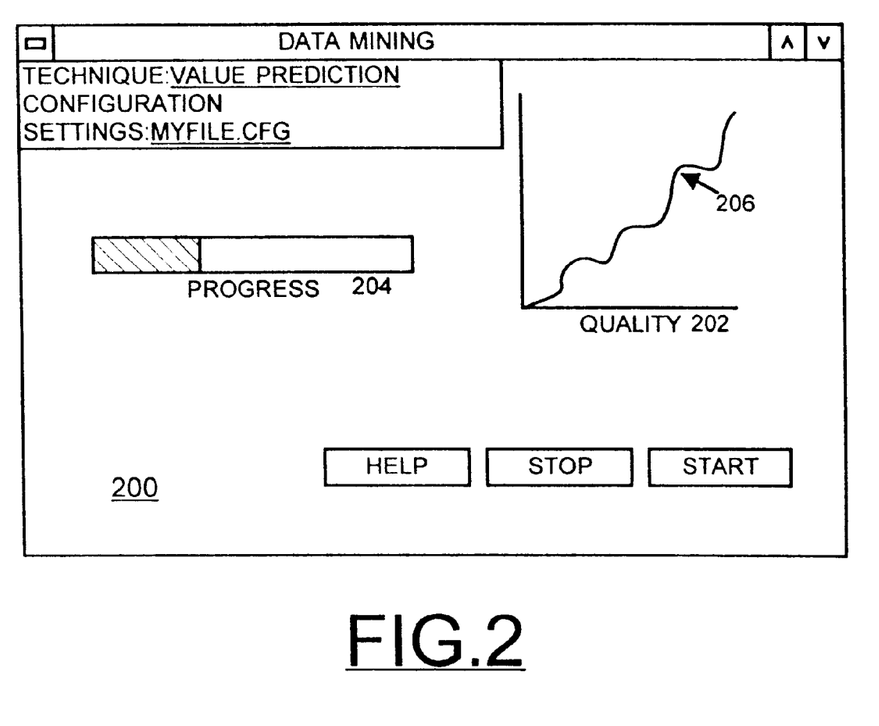
FIG. 2 is an exemplary diagram illustrating a portion of a display screen of the system of FIGS. 1A and 1B for displaying a visual quality indicator in a graph on the computer display screen with mining task progress information of the preferred embodiment.

Referring to FIG. 2, there is shown a display screen portion 200 of the system 100. In accordance with the preferred embodiment, a quality indicator 202 is displayed for a data mining operation. A progress indicator 204 also is displayed for data mining operation. In accordance with the preferred embodiment, the quality indicator 202 is displayed in graphical format 206, for example, as shown in FIG. 2. The quality indicator 202 may be a numeric value normalized to range from 0 to 1. When the data mining program 132, for example, polls a server to check on a data mining job status, quality measure information is passed back with the particular mining task progress information to the computer system 100. The data mining program 132 including the quality monitor function 134 plots the quality indicator values 202 on a line chart 206. Thus a user is provided visual feedback, such as, a positive or negatively sloping line (goodness) or flat or oscillating line (badness) of how the mining job is doing. Using this additional information, the user can make an informed decision as to whether or not to abort or continue the mining task. Data mining operations can take several hours or even days to complete, the graphical quality indication 206 indicating whether the quality of the data mining operation is increasing or decreasing gives the user valuable information to help the user decide whether to stop the data mining operation and reconfigure the operation.

Figure 3:
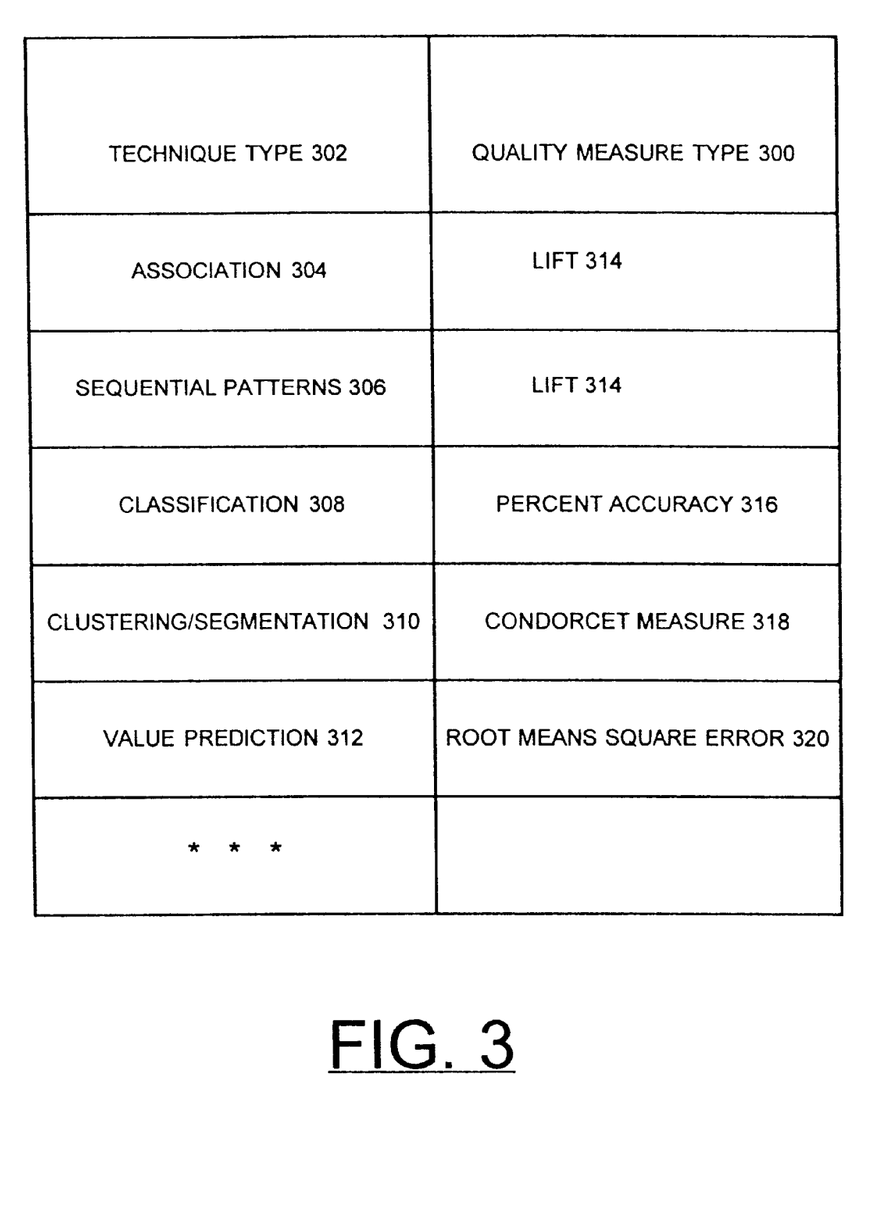
FIG. 3 is a diagram illustrating multiple exemplary mining technique types together with exemplary quality measure types of the preferred embodiment.

Referring to FIG. 3, exemplary data mining technique types 302 include an association data mining technique type 304, sequential patterns data mining technique type 306, a classification data mining technique type 308, a clustering/segmentation data mining technique type 310 and a value prediction data mining technique type 312. A particular one of multiple quality measure types 300 including a lift 314, a percent accuracy 316, a condorcet measure 318 or a root mean square error 318 is set as a default quality measure type for use with the data mining technique types 302. For example as shown in FIG. 3, the lift quality measure type 314 is set as the default quality measure type for use with the association data mining technique type 304, and the sequential patterns data mining technique type 306. The percent accuracy quality measure type 316 is set as the default quality measure type for use with the classification data mining technique type 308. The condorcet measure 318 is set as the default quality measure type for use with the clustering/segmentation data mining technique type 310. The root mean square error 318 is set as the default quality measure type for use with the value prediction data mining technique type 312.

Figure 4:
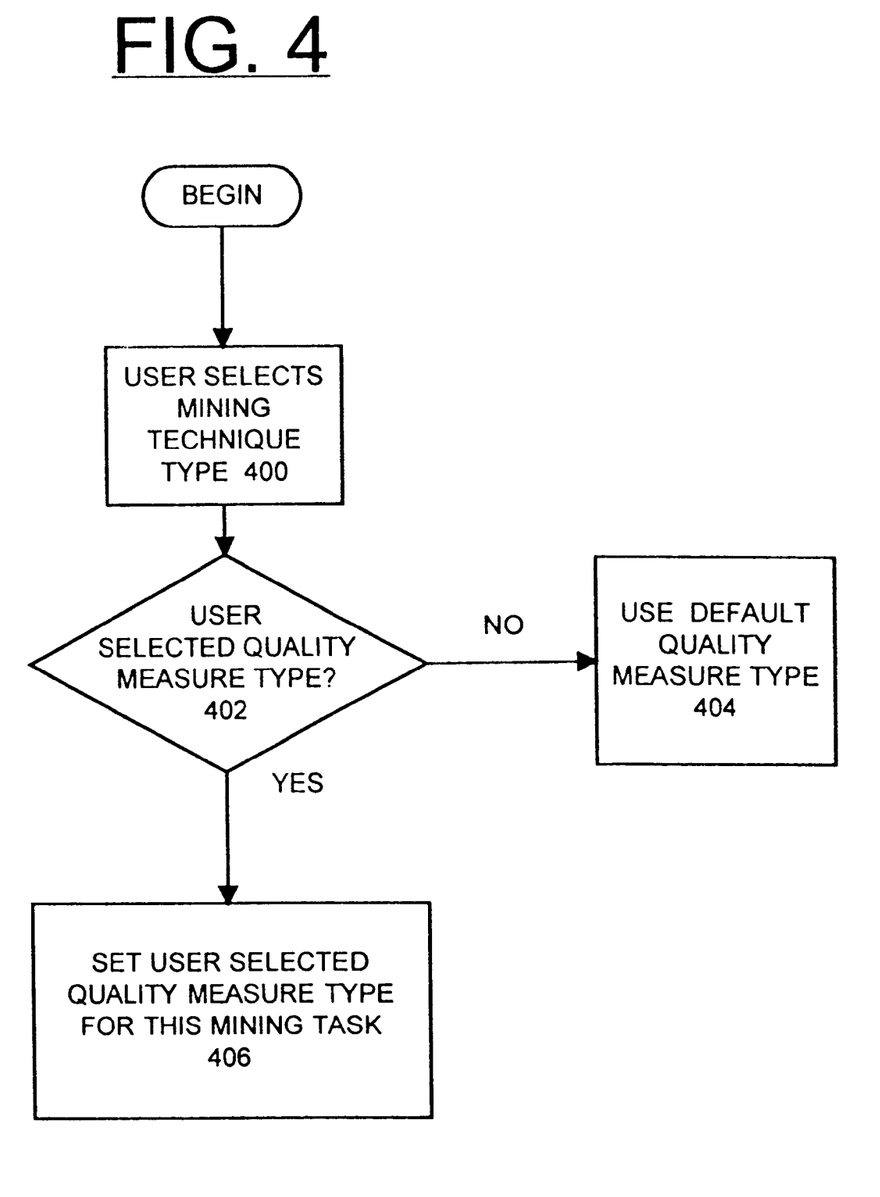
FIGS. 4 and 5 together provide a flow chart illustrating sequential steps for data mining including the feedback mechanism for monitoring performance of mining tasks of the preferred embodiment.
Figure 5:
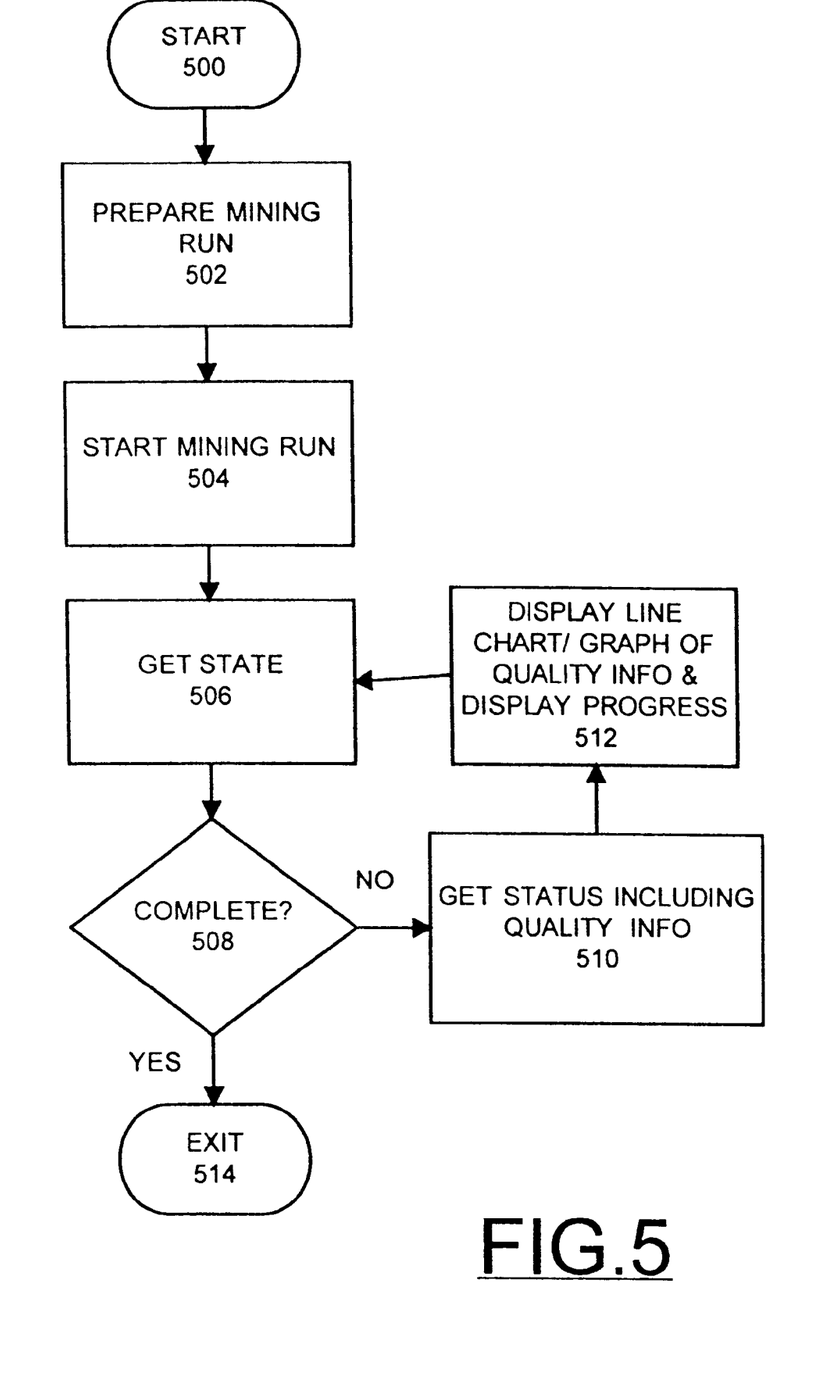

Referring now to FIGS. 4 and 5, there are shown sequential steps illustrating a data mining operation including the feedback mechanism for monitoring performance of mining tasks of the preferred embodiment. A particular mining technique type 302 for the data mining operation is selected by the user as indicated at a block 400. Then checking for a user selected quality measure type is performed as indicated at a decision block 402. A default quality measure type or a user selected quality measure type is set for the particular mining task as indicated at respective blocks 404 and 406.

Referring to FIG. 5, a particular mining operation begins as indicated at a block 500. Preparation for the mining run, such as performing the sequential steps of FIG. 4, is performed as indicated at a block 502. A particular mining task starts as indicated at a block 504. State information for the mining task is obtained as indicated at a block 506. Checking whether the mining task is complete is performed as indicated at a decision block 508. If not, then status information including measured quality information and progress information is obtained as indicated at a block 510. Then as indicated at a block 512, a line chart or graph of the quality indicator 202 relative to time for the data mining operation is displayed, such as the quality indicator graph 206 on display 200 while the data mining operation is progressing. In this way, the user can tell if the quality of the data mining operation is increasing or decreasing while the data mining operation is progressing. The sequential operations return to block 506 and are repeated until it is determined that the mining task is completed at decision block 508.

Figure 6:
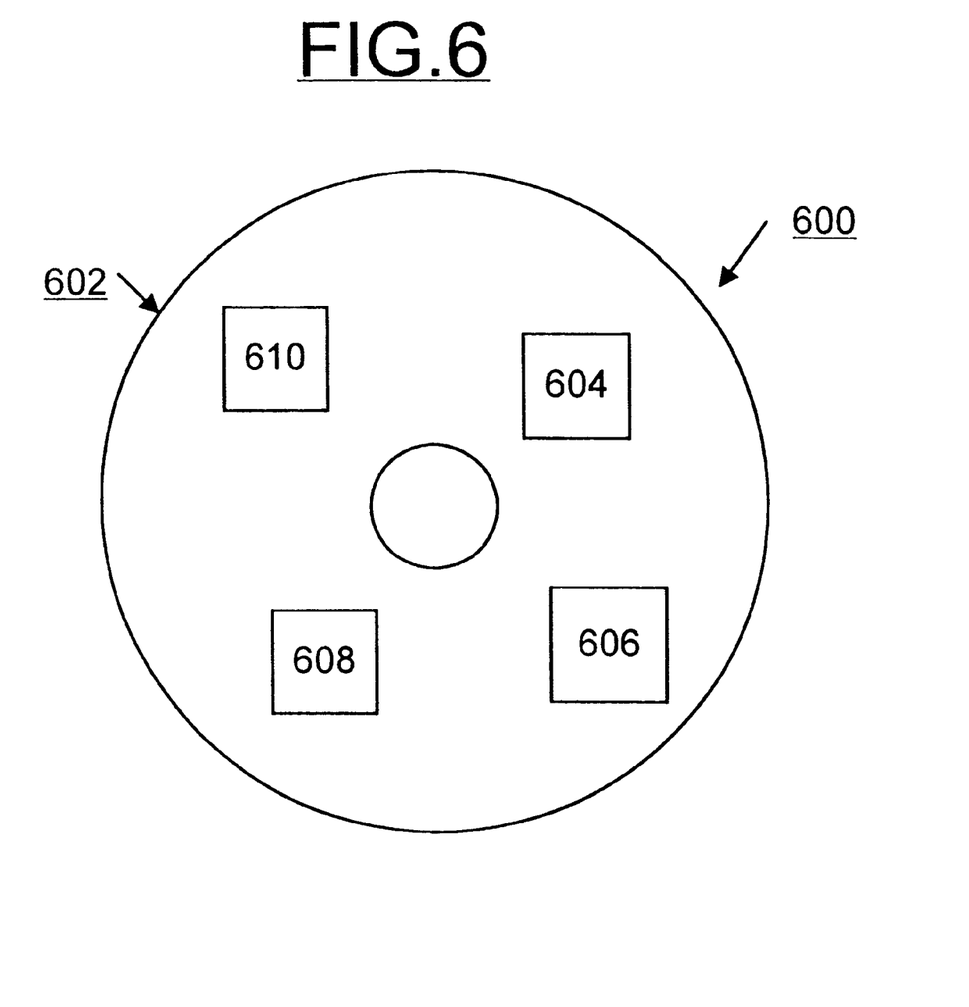
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods of the preferred embodiment in the system 100 of FIGS. 1A and 1B.

A sequence of program instructions or a logical assembly of one or more interrelated modules defined by the recorded program means 604, 606, 608, 610, direct the computer system 100 for data mining operation including a feedback mechanism for monitoring performance of mining tasks of the preferred embodiment.

While the present invention has been described with reference to the details of the embodiments of the invention shown in the drawing, these details are not intended to limit the scope of the invention as claimed in the appended claims.

What is claimed is:

1. A method for displaying a visual quality indicator for a data mining operation, said method comprising the steps of:

receiving a user selected mining technique type for the data mining operation, said user selected mining technique type being used to analyze a collection of data for the data mining operation;

identifying a quality measure type for said user selected mining technique type;

processing said user selected mining technique type for the data mining operation and measuring a quality indicator using said quality measure type;

displaying said measured quality indicator while processing said user selected mining technique type for the data mining operation; and wherein said step of identifying said quality measure type for said user selected mining technique type includes the steps of checking for a user selected quality measure type; and utilizing an identified user selected quality measure type for said user selected mining technique type for the data mining operation; said user selected mining technique type comprising one of association, sequential patterns, classification, clustering/segmentation, and value prediction.

2. A method for displaying a visual quality indicator for a data mining operation as recited in claim 1 wherein said step of identifying said quality measure type for said user selected mining technique type includes the step of utilizing a default quality measure type value for said user selected mining technique type for the data mining operation; said quality measure type for said user selected mining technique type comprising one of a lift, a percent accuracy, a condorcet measure, and a root mean square error.

3. A method for displaying a visual quality indicator for a data mining operation as recited in claim 1 wherein said step of displaying said measured quality indicator while processing said user selected mining technique type for the data mining operation includes the step of obtaining status information for said user selected mining technique type for the data mining operation, said status information including said measured quality indicator.

4. A method for displaying a visual quality indicator for a data mining operation as recited in claim 3 further includes the step of displaying progress information; said status information including said progress information.

5. A method for displaying a visual quality indicator for a data mining operation as recited in claim 1 wherein said step of displaying said measured quality indicator while processing said user selected mining technique type for the data mining operation includes the step of plotting and displaying a line chart of said measured quality indicator.

6. A computer program product for displaying a visual quality indicator for a data mining operation, the computer program product comprising:

a recording medium;

means, recorded on the recording medium, for receiving a user selected mining technique type for the data mining operation, said user selected mining technique type being used to analyze a collection of data for the data mining operation;

means, recorded on the recording medium, for identifying a quality measure type for said user selected mining technique type;

means, recorded on the recording medium, for processing said user selected mining technique type for the data mining operation and measuring a quality indicator using said quality measure type;

means, recorded on the recording medium, for displaying said measured quality indicator while processing said user selected mining technique type for the data mining operation; and wherein said means, recorded on the recording medium, for identifying said quality measure type for said user selected mining technique type includes means, recorded on the recording medium, for checking for a user selected quality measure type; and for utilizing an identified user selected quality measure type for said user selected mining technique type for the data mining operation; said user selected mining technique type comprising one of association, sequential patterns, classification, clustering/segmentation, and value prediction.

7. A computer program product for displaying a visual quality indicator for a data mining operation as recited in claim 6 wherein said means, recorded on the recording medium, for identifying said quality measure type for said user selected mining technique type includes means, recorded on the recording medium, for identifying a corresponding one of a plurality of predetermined default quality measure type for said user selected mining technique type for the data mining operation; said quality measure type for said user selected mining technique type comprising one of a lift, a percent accuracy, a condorcet measure, and a root mean square error.

8. A computer program product for displaying a visual quality indicator for a data mining operation as recited in claim 6 wherein said means, recorded on the recording medium, for displaying said measured quality indicator while processing said user selected mining technique type for the data mining operation includes means, recorded on the recording medium, for obtaining status information for said user selected mining technique type for the data mining operation, said status information including said measured quality indicator.

9. A computer program product for displaying a visual quality indicator for a data mining operation as recited in claim 6 wherein said status information includes progress information and wherein said means, recorded on the recording medium, for displaying said measured quality indicator include means for displaying said progress information.

10. Apparatus for displaying a visual quality indicator for a data mining operation, said apparatus comprising:

means for receiving a user selected mining technique type for the data mining operation, said user selected mining technique type being used to analyze a collection of data for the data mining operation;

means for identifying a quality measure type for said user selected mining technique type;

means for processing said user selected mining technique type for the data mining operation and measuring a quality indicator using said quality measure type;

means for displaying said measured quality indicator while processing said user selected mining technique type for the data mining operation; and wherein said means for identifying said quality measure type for said user selected mining technique type include means for identifying one of a plurality of predetermined default quality measure types corresponding to said user selected mining technique type; said quality measure type for said user selected mining technique type comprising one of a lift, a percent accuracy, a condorcet measure, and a root mean square error.

11. Apparatus for displaying a visual quality indicator for a data mining operation as recited in claim 10 wherein said means for displaying said measured quality indicator while processing said user selected mining technique type for the data mining operation include means for plotting and displaying a line graph of said measured quality indicator with respect to time.

12. Apparatus for displaying a visual quality indicator for a data mining operation as recited in claim 10 wherein said means for identifying said quality measure type for said user selected mining technique type include means for checking for a user selected quality measure type; and means for utilizing an identified user selected quality measure type for said user selected mining technique type for the data mining operation; said user selected mining technique type comprising one of association, sequential patterns, classification, clustering/segmentation, and value prediction.

13. Apparatus for displaying a visual quality indicator for a data mining operation as recited in claim 10 wherein said means for displaying said measured quality indicator while processing said user selected mining technique type for the data mining operation includes means for obtaining status information for said user selected mining technique type for the data mining operation, said status information including said measured quality indicator and progress information and means for displaying said progress information.

\* \* \* \* \*